(12) United States Patent
Liu et al.

(10) Patent No.: US 10,679,366 B1
(45) Date of Patent: Jun. 9, 2020

(54) HIGH SPEED COMPUTATIONAL TRACKING SENSOR

(71) Applicant: Facebook Technologies, LLC, Menlo Park, CA (US)

(72) Inventors: Xinqiao Liu, Medina, WA (US); Richard Andrew Newcombe, Seattle, WA (US); Steven John Lovegrove, Woodinville, WA (US); Renzo De Nardi, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 92 days.

(21) Appl. No.: 15/856,028

(22) Filed: Dec. 27, 2017

Related U.S. Application Data

(60) Provisional application No. 62/452,167, filed on Jan. 30, 2017.

(51) Int. Cl.
| | |
|---|---|
| *G06T 7/521* | (2017.01) |
| *H04N 5/3745* | (2011.01) |
| *H04N 13/254* | (2018.01) |
| *H04N 5/378* | (2011.01) |
| *G06T 7/73* | (2017.01) |
| *H04N 5/225* | (2006.01) |

(52) U.S. Cl.
CPC ............... *G06T 7/521* (2017.01); *G06T 7/74* (2017.01); *H04N 5/378* (2013.01); *H04N 5/37455* (2013.01); *H04N 13/254* (2018.05); *G06T 2207/10028* (2013.01); *H04N 5/2256* (2013.01)

(58) Field of Classification Search
CPC . G06T 7/521; G06T 7/74; G06T 2207/10028; H04N 5/37455; H04N 13/254; H04N 5/378; H04N 5/2256; H04N 5/379; H04N 5/37452; H04N 5/3745; H04N 5/3355
USPC .................................................. 348/308
See application file for complete search history.

(56) References Cited

U.S. PATENT DOCUMENTS

| | | | | |
|---|---|---|---|---|
| 7,623,152 | B1 * | 11/2009 | Kaplinsky | G06T 7/254 348/155 |
| 2002/0140842 | A1 * | 10/2002 | Olding | H04N 5/235 348/362 |
| 2008/0007731 | A1 * | 1/2008 | Botchway | H04N 5/3454 356/338 |
| 2010/0276572 | A1 * | 11/2010 | Iwabuchi | H01L 23/481 250/208.1 |

(Continued)

*Primary Examiner* — Albert H Cutler
(74) *Attorney, Agent, or Firm* — Fenwick & West LLP

(57) ABSTRACT

A depth measurement assembly (DMA) includes a structured light emitter, an augmented camera, and a controller. The structured light emitter projects structured light into a local area under instructions from the controller. The augmented camera generates image data of an object illuminated with the structured light pattern projected by the structured light emitter in accordance with camera instructions generated by the controller. The augmented camera includes a high speed computation tracking sensor that comprises a plurality of augmented photodetectors. Each augmented photodetector converts light to data and stores the data in its own memory unit. The controller receives the image data and determines depth information of the object in the local area based in part on the image data. The depth measurement unit can be incorporated into a head-mounted display (HMD).

19 Claims, 8 Drawing Sheets

(56) References Cited

U.S. PATENT DOCUMENTS

| | | | |
|---|---|---|---|
| 2011/0007199 A1* | 1/2011 | Heim | H04N 5/35509 |
| | | | 348/302 |
| 2016/0373728 A1* | 12/2016 | Cho | H04N 13/128 |
| 2018/0061034 A1* | 3/2018 | Zhao | G02B 27/0172 |
| 2019/0052821 A1* | 2/2019 | Berner | G01B 11/2518 |

* cited by examiner

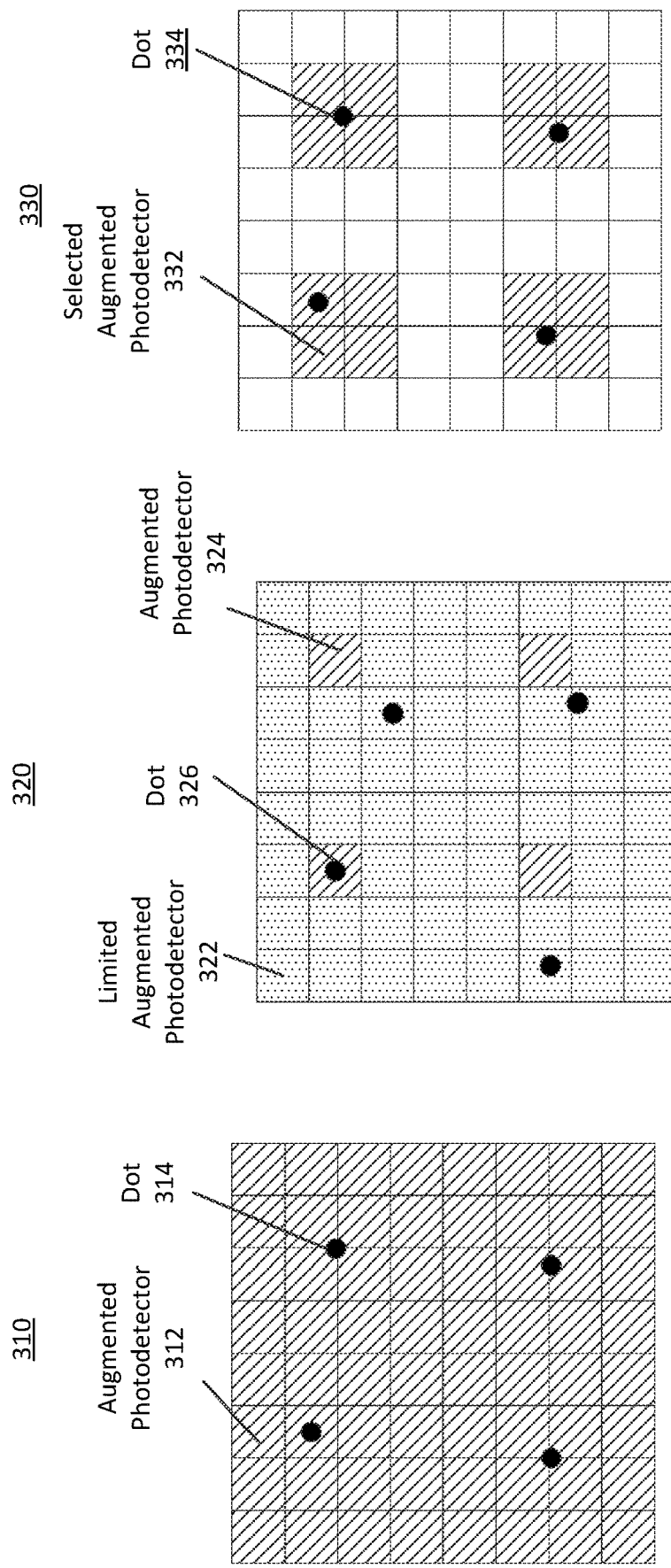

HIGH SPEED COMPUTATIONAL TRACKING SENSOR

CROSS-REFERENCE TO RELATED APPLICATIONS

This application claims the benefit of U.S. Provisional Patent Application No. 62/452,167, filed Jan. 30, 2017, the disclosure of which is hereby incorporated by reference in its entirety.

BACKGROUND

The present disclosure generally relates to high speed depth measurement, and specifically relates to using a high speed computational tracking sensor for depth measurement in head-mounted display (HMD) applications.

Depth measurement is an important feature for HMD systems, such as systems used in virtual reality and augmented reality applications. Existing depth measurement systems have the drawback of slow computation speed and/or high requirement for system resources. These depth measurement systems impair user experience of HMD and consume more system resources than preferred.

SUMMARY

A depth measurement unit includes a high speed computation tracking sensor. The depth measurement unit determines depth information for one or more objects in a local area. In some embodiments the local area is an area surrounding a HMD. In alternate embodiments, the local area may be an area where a user of the HMD's eye is located. The depth measurement unit can be incorporated into a HMD. The depth measurement unit comprises a structured light emitter, an augmented camera, and a controller. The structured light emitter projects a structured light pattern into a local area. The augmented camera captures the structured light pattern reflected from an object in the local area and generates image data. The controller coordinates how the structured light emitter emits light and how the augmented camera captures images and determines depth information of the object based in part on the image data.

The augmented camera includes a high speed computational tracking sensor, which comprises a plurality of augmented photodetectors. An augmented photodetector converts photons to digital signals and stores the digital signals within a memory unit that is part of the augmented photodetector. In some embodiments, the memory units of different augmented photodetectors may be different sizes (e.g., 8 bit versus 16 bit). The augmented camera generates images of the object based on the digital signals stored in the memory units of the augmented photodetectors. The images can be used by, e.g., the controller, to determine depth information for the object via a variety of techniques including, e.g., stereo vision, photometric stereo, structured light (SL), or some combination thereof.

The depth measurement unit may have more than one structured light emitter and more than one augmented camera. The controller may control all structured light emitters and augmented cameras of the depth measurement unit.

In some embodiments, the depth measurement unit is part of a HMD. The HMD comprises an electronic display, an optics block, and a depth measurement unit, and may be for operation in an artificial reality environment. The electronic display displays a virtual object based in part on the depth information. The optics block directs light from the electronic display element to an exit pupil of the HMD. In one embodiment, the depth measurement unit determines depth information of an eye of a user of the HMD. Based on the depth information of the eye, the depth measurement unit or a console of the HMD system further estimates positions and/or orientations of the eye based on the depth information. The depth measurement unit of the embodiment may include two structured light emitters and two augmented cameras for both eye of the user.

BRIEF DESCRIPTION OF THE DRAWINGS

FIG. 3A is a diagram of a tracking sensor that includes augmented photodetectors, the tracking sensor configured to operate in a full frame mode, in accordance with an embodiment.

FIG. 3B is a diagram of a tracking sensor that includes both augmented photodetectors and limited augmented photodetectors, the tracking sensor configured to operate in a full frame mode, in accordance with an embodiment.

FIG. 3C is a diagram of a tracking sensor configured to operate in a tracking mode, in accordance with an embodiment.

Figure 1:
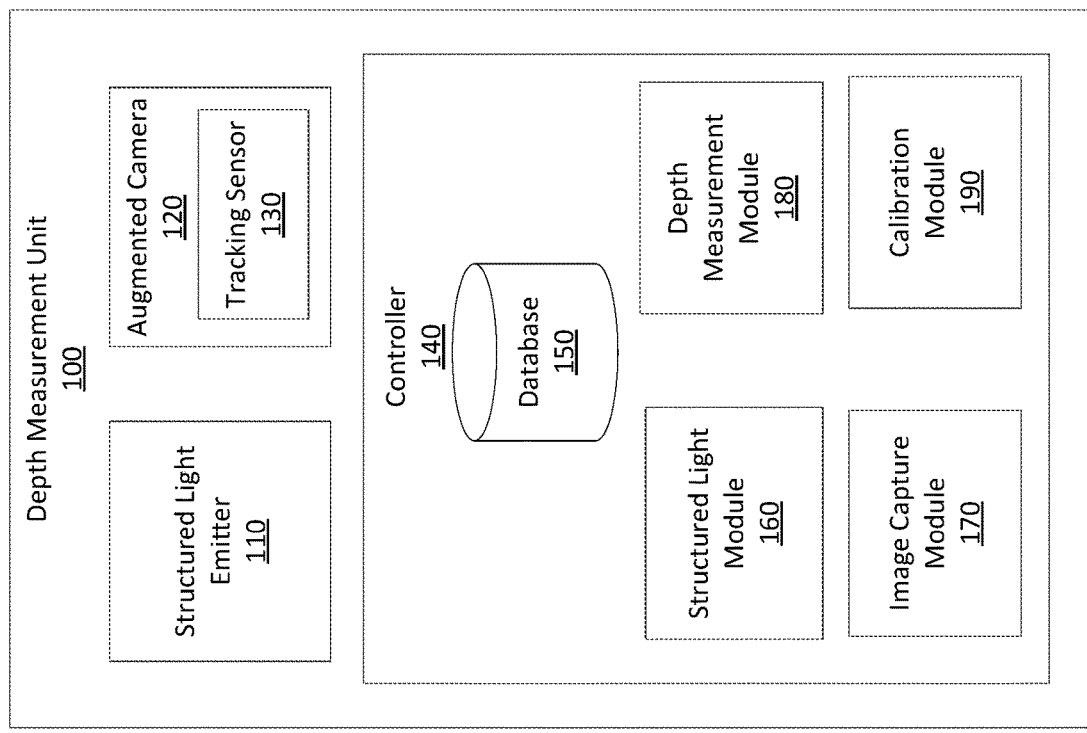
FIG. 1 is a high-level block diagram illustrating a detailed view of a depth measurement unit, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Configuration Overview

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a 3D effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

A depth measurement unit determines depth information for one or more objects in a local area. The depth measurement unit comprises a structured light emitter, an augmented camera, and a controller. The augmented camera captures images of an object illuminated with a structured light pattern by the structured light emitter. The augmented camera includes a high speed computational tracking sensor, which comprises a plurality of augmented photodetectors. In some embodiments, an augmented photodetector includes a photodiode that converts photos to electrons. In addition or alternative to a photodiode, an augmented photodetector can include a light sensitive thin film that converts photons to electrons. An augmented photodetector further includes an ADC and a memory unit. An augmented photodetector converts photons to digital signals and stores the digital signals within its memory unit. In some embodiments, the memory units of different augmented photodetectors may be different sizes (e.g., 8 bit versus 16 bit). The augmented camera can operate in a full frame mode, a tracking mode, or a combination of both. The augmented camera reads out image data from the memory units of the augmented photodetectors. Based at least on the image data, the controller determines depth information for the object.

System Overview

FIG. 1 is a high-level block diagram illustrating a detailed view of a depth measurement unit 100, in accordance with an embodiment. Some embodiments of the depth measurement unit 100 have different components than those described here. Similarly, the functions can be distributed among the components in a different manner than is described here. For example, the controller 140 or one or more modules thereof may be located on a console.

The depth measurement unit 100 determines depth information for one or more objects. The depth measurement unit 100 includes one or more structured light emitters 110, one or more augmented cameras 120, and a controller 140. The structured light emitter 110 emits a structured light pattern. Structured light represents a known pattern (often grids, dots, or horizontal bars) that is projected on a surface of an object (e.g., an eye of the user or a local area) and the pattern appears to be distorted when viewing the surface of the object at a different angle and/or distance. Example structured light patterns include: a dot matrix pattern, a single line pattern, a sinusoid pattern, a multi (spatial) tone pattern, and a grid pattern. The structured light emitter 110 may generate the structured light using, e.g., one or more diffractive optical elements that are illuminated by one or more light sources. The illuminated one or more diffractive optical elements generate at least one structured light pattern that is then projected onto a surface of an object. By detecting the distortion of the structured light pattern on the surface of the object, the depth measurement unit 100 can determine depth information of the object. The structure light emitter 110 may emit light in the visible band (i.e., ~380 nm to 750 nm), in the infrared (IR) band (i.e., ~750 nm to 1 mm), in the ultraviolet band (i.e., 10 nm to 380 nm), some other portion of the electromagnetic spectrum, or some combination thereof.

The augmented camera 120 generates image data by capturing the structured light reflected from one or more objects in a field of view of the augmented camera 120. The augmented camera 120 can be located outside of a main light of sight of a user. In some embodiments, the augmented camera 120 is co-located with the structured light emitter (e.g., may be part of the same device).

The augmented camera 120 includes a tracking sensor 130 that detects structured light pattern in a field of view of the augmented camera 120. The tracking sensor 130 is configured for high speed computation of structured light pattern in a scene illuminated with structured light emitter 110. The tracking sensor 130 comprises a plurality of augmented photodetectors. An augmented photodetector converts photons to digital signals and stores the digital signals within a memory unit that is part of the augmented photodetector. An augmented photodetector may include one or more photodiodes, one or more light sensitive thin films, or some combination thereof. In some embodiments, each augmented photodetector has a memory of the same storage size (e.g., 16 bit memory). In alternate embodiments, some number (e.g., 80%) of the plurality of augmented photodetectors have a truncated memory (e.g., 8 bit memory), also referred to as limited augmented photodetectors. A limited augmented photodetector may include one or more photodiodes, one or more light sensitive thin films, or some combination thereof. The augmented camera 120 reads out the stored digital signals to generate image data that is provided to the controller 140. Image data is output from the augmented camera 120 and include digital signals read out from all or a subset of the augmented photodetectors and/or limited augmented photodetectors of the tracking sensor 130. In some embodiments, as discussed in detail below, the image data may also include values that correspond to one or more augmented photodetectors and/or limited augmented photodetectors whose values were not read out from the augmented camera 120. More details of augmented photodetectors are described in conjunction with FIG. 2A and FIG. 2B.

In some embodiments, the tracking sensor 130 further comprises a filter. The filter is transparent to wavelengths emitted from the structured light emitter 110. Accordingly, structured light reflected from an object is transmitted through the filter and is captured by the tracking sensor 130, and one or more other bands of light are blocked (e.g., block's some or all of the visible band). Thus, some of the plurality of augmented photodetectors and/or limited augmented photodetectors capture less light or no light at all. Consequently, digital signals of the plurality of augmented photodetectors and/or limited augmented photodetectors have different values. In one embodiment, the augmented camera 120 reads out digital signals that exceeds a threshold value. The augmented camera 120 may assign a value (e.g., a black value, i.e., zero) to each of the non-readout augmented photodetectors and/or limited augmented photodetectors. The augmented camera 120 outputs the digital signals and the assigned values as image data. Alternatively, the augmented camera 120 outputs the digital signals as image data to the controller 140, where the controller 140 assign a value to each of the non-readout augmented photodetectors and/or limited augmented photodetectors to generate an image frame.

In some embodiments, the tracking sensor 130 operates in a full frame mode, where each of the plurality of augmented photodetectors of the tracking sensor 130 converts absorbed photons into a digital signal. The augmented camera 120 reads out digital signals from the plurality of augmented photodetectors and output the digital signals as image data. In the full frame mode, the tracking sensor 130 generates an image corresponding to a field of view of a local area imaged by the augmented camera 120. The captured image may or may not include structured light (e.g., when the structured light emitter 110 is not illuminating the local area when the image is taken). Accordingly, the augmented camera 120 may capture frames including structured light and frames without structured light.

In embodiments where the tracking sensor 130 includes a plurality of limited augmented photodetectors and a plurality of augmented photodetectors, the tracking sensor 130 may also operate in a full frame mode. In this case, the limited augmented photodetectors and augmented photodetectors converts absorbed photons into digital signals that are stored in their respective memory units. The digital signals from the limited augmented photodetectors have less bits than the digital signal from the augmented photodetectors. In some cases, one or more of the memory units associated with the limited augmented photodetectors may saturate. Accordingly, as described below, additional processing may be needed to accurately determine the location of the structured light pattern in the image frame. However, this type of tracking sensor 130 has a number of advantages. For example, the respective memories of the limited augmented photodetectors are physically smaller than that of the augmented photodetectors. Accordingly, it is possible to have a larger number of pixels on a tracking sensor that includes both augmented photodetectors and limited augmented photodetectors (i.e., potentially higher resolution). Also, the bandwidth for data transmission from the augmented camera 120 to the controller 140 can be reduced. The reduction in the bandwidth results in power and latency reduction.

The tracking sensor 130 can also operate in a tracking mode. In a tracking mode, the tracking sensor 130 reads out augmented photodetectors and/or limited augmented photodetectors in accordance with camera instructions from the controller 140. Camera instructions are instructions that control the augmented camera 120. Camera instructions include the mode of operation of the tracking sensor 130, identifies augmented photodetectors for readout, identifies limited augmented photodetectors for readout, shutter speed, ISO, aperture size, a number of shutter triggers, some other parameter used by the augmented camera 120 to capture image data, or some combination thereof. Note, in some embodiments, some of the camera instructions may be determined directly by the augmented camera 120. For example, portions of the camera instructions relating to exposure (e.g., shutter speed, ISO, etc.). In the tracking mode, digital signals from a relatively small number of the augmented photodetectors and/or limited augmented photodetectors are read out. Accordingly, the augmented camera 120 can output image data much faster in the tracking mode than, e.g., in a full frame mode.

In some embodiments of the tracking mode, the augmented camera 120 outputs the digital signals as image data. The controller 140, receiving the image data, assigns a value to each of the non-readout augmented photodetectors and/or limited augmented photodetectors. In alternative embodiments of the tracking mode, the augmented camera 120 assigns a value to each of the non-readout augmented photodetectors and/or non-read out limited augmented photodetectors and outputs the value as part of the image data.

The tracking sensor 130 may operate in either full frame mode or tracking mode as discussed above. Additionally, in some embodiments, image data from the full frame mode and the tracking mode can be interleaved, where the full frame capture mode operates periodically (for example, 30 frames per second) for 2D images and replenishes missing structured light patterns.

The controller 140 controls the structured light emitter 110 and the augmented camera 120. The controller 140 also determines depth information using image data generated by the augmented camera 120. The controller 140 can also generate tracking information based on the depth information. Tracking information is information indicating positions, orientations and/or movement of objects and/or HMD orientation. Tracking information includes, e.g., depth information of a local area, movement information of an object, position and orientation of one or both eyes of the user, gaze direction (e.g., where a user is looking), vergence, estimated accommodation plane, etc.

In the example shown by FIG. 1, the controller 140 includes a database 150, a structured light module 160, an image capture module 170, a depth measurement module 180, and a calibration module 190. These modules are software modules implemented on one or more processors, dedicated hardware units, or some combination thereof. Some embodiments of the controller 140 have different components than those described in conjunction with FIG. 1. Similarly, functions of the components described in conjunction with FIG. 1 may be distributed among other components in a different manner than described in conjunction with FIG. 1. For example, some or all of the functionality described as performed by the controller 140 may be performed by a HMD console.

The database 150 stores data generated and/or used by the depth measurement unit 100. The database 150 is a memory, such as a ROM, DRAM, SRAM, or some combination thereof. The database 150 may be part of a larger digital memory of a HMD system. In some embodiments, the database 150 stores image data from the augmented camera 120, baseline data from the calibration module 190 describing trained or established baseline prior to depth measurement, depth information, and analysis data from the depth measurement module 180 describing characterization parameters. In some embodiments, the database 150 may store calibration data and/or other data from other components.

The database 150 also stores a model of objects, of which the augmented camera 120 captures images. The model is used to compare to the image captured by the augmented camera to determine depth and tracking information of the object. The model stored in the database 150 can be a 3D model which approximates the surface geometry of the object. In embodiments in which the augmented camera 120 captures images of more than one object, the database 150 may contain more than one model. In one embodiment, the model stored in the database 150 is a model of an eye of a user for estimating orientations of the eye. More information about a model used for tracking an object is disclosed in U.S. Patent Application No. 62/249,852, hereby incorporated by reference in its entirety.

The structured light module 160 controls the structured light emitter 110. The structured light module 160 is a software module implemented on one or more processors, a dedicated hardware unit, or some combination thereof. The structured light module 160 determines a structured light pattern emitted by the structured light emitter 110. In some embodiments, the structured light module 160 selects the structured light pattern based on the previously reported depth information of an object as reported by the depth measurement unit 100. Structured light patterns determined by the structured light module 160 may include dot, single line, sinusoid, grid, multi-tone pattern, and other types of patterns. For the purpose of illustration, the discussion hereinafter is based on a dot pattern.

The image capture module 170 controls the augmented camera 120 via camera instructions. The image capture module 170 is a software module implemented on one or more processors, a dedicated hardware unit, or some combination thereof. The image capture module 170 generates camera instructions based in part on image data from the augmented camera 120. For example, the camera instructions cause the augmented camera 120 to periodically operate in a full frame mode. The periodical operation in the full frame mode ensures that the depth measurement unit 100 does not lose tracking. For example, when there has not been image data for more than a threshold amount of time (e.g., 500 ms), the camera instructions cause the next frame taken by the augmented camera 120 to be in a full frame mode. The image capture module 170 analyzes the image data to determine locations of the structured light pattern in the image data. For example, an image is generated from the image data; and the image illustrates the locations of the structured light pattern.

The image capture module 170 predicts locations of the structured light pattern in the next frame to be readout. The image capture module 170 further identifies augmented photodetectors and/or limited augmented photodetectors corresponding to the predicted locations. Based on the identification, the image capture module 170 determines which augmented photodetectors and/or limited augmented photodetectors to read out. In some embodiments, the image capture module 170 identifies the augmented photodetectors and/or limited augmented photodetectors that captured the structured light. In some embodiments, if there has not been image data for more than a threshold amount of time (e.g., 500 ms), the image capture module 170 generates camera instructions that cause a next frame taken by the augmented camera 120 to be in a full frame mode.

If image data has been received before the threshold period of time, the image capture module 170 generates camera instructions such that a next frame taken by the augmented camera 120 is in a tracking mode. In these embodiments, the image capture module 170 determines groups of one or more augmented photodetectors and/or limited augmented photodetectors that include and/or neighbor the identified augmented photodetectors and/or limited augmented photodetectors. In some embodiments, the size of a group may be predetermined. For example, for a given identified photodetector (i.e., an augmented photodetector or a limited photodetector) a group may be 3×3 array of photodetectors (i.e., limited augmented photodetectors and/or augmented photodetectors) that includes (e.g., as the center photodiode in the array) the identified photodiode. In other embodiments, the size of a group may be based in part on whether the captured portion of the SL portion is moving relative to an object in the local area. For example, the size of the group may scale with the relative movement (e.g., 3×3 array of photodetectors for no movement versus 10×10 array of photodetectors for fast relative movement). In embodiments, where the augmented camera 120 includes a filter, the camera instructions may simply be to read-out image data from photodiodes whose signal is above some threshold value. The image capture module 170 then updates the generated camera instructions such that when executed by the augmented camera 120, image data is read out from photodiodes included in the groups.

The image capture module 170 provides a camera instruction to the augmented camera 120 to read out the augmented photodetectors and/or limited augmented photodetectors and output image data.

The depth measurement module 180 receives the image data from the augmented camera 120 and outputs depth and tracking information of the one or more objects. The depth measurement module 180 is a software module implemented on one or more processors, a dedicated hardware unit, or some combination thereof. The depth measurement module 180 generates images using the image data. But in embodiments where the augmented camera 120 does not read out all the augmented photodetectors and/or limited augmented photodetectors of the tracking sensor 130 or assign values to the non-readout augmented photodetectors and/or limited augmented photodetectors, the depth measurement module 180 assigns a black value to each of the non-readout augmented photodetectors and/or limited augmented photodetectors to generate an image frame. In some embodiments, the depth measurement module 180 uses a known structure of the projected structured light pattern to determine distortions in the structured light pattern caused by shapes of objects in the image data and calculate distances between the objects and the augmented camera 120. From the distortions, the depth measurement module 180 attributes depth information to different portions of the image. Using the depth information, the depth measurement module 180 can further generate an approximation of a 3D surface of one or more objects in the image data.

In some embodiments, the depth measurement module 180, by using a model of an eye of a user stored in the database 150, generates a 3D approximation of the surface of the eye, corresponding to the area of the object illuminated by the structured light emitter 110. The surface approximation of the object can be used by the depth measurement module 180 to compare to the model of the object retrieved from the database 150 for estimating an orientation of the object.

In some embodiments, a calibration sequence occurs prior to depth measurement, and the calibration module 190 generates and/or trains a model of objects stored in the database 150 during the calibration sequence. The calibration module 190 is a software module implemented on one or more processors, a dedicated hardware unit, or some combination thereof. The calibration sequence implemented by the calibration module 190 may involve using the augmented camera 120 and the structured light emitter 110 to repeatedly scan the object. These scans of the object can be interpolated into the model of the object.

Figure 2A:
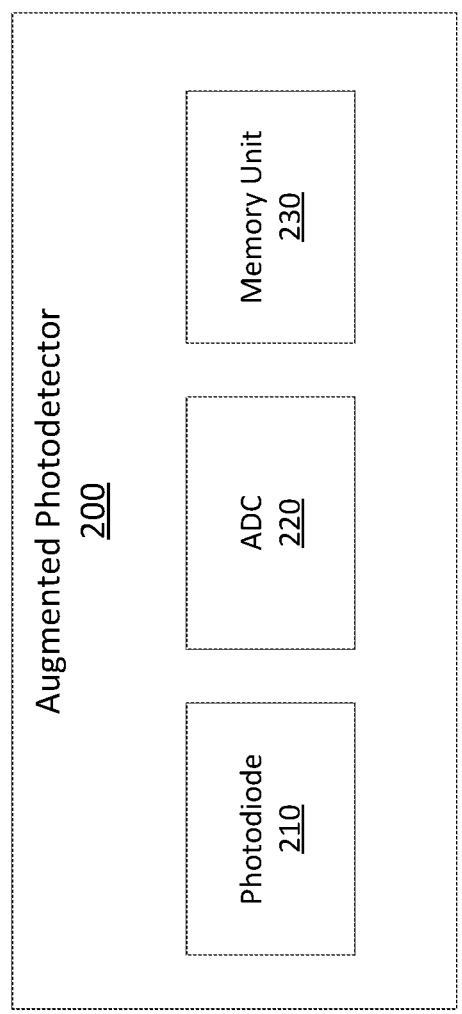
FIG. 2A is a diagram of an augmented photodetector, in accordance with an embodiment.

FIG. 2A is a diagram of an augmented photodetector 200, in accordance with an embodiment. The augmented photodetector 200 comprises a photodiode 210, an ADC 220, and a memory unit 230. The photodiode 210 operates during exposure and converts photons into an electrical charge. Electrical charge is generated when photons are absorbed by the photodiode 210. In some embodiments, the photodiode 210 is sensitive to wavelengths same to or close to the light bands emitted from the structured light emitter 110. Another embodiment of the augmented photodetector 200 includes a light sensitive thin film (i.e., an image sensing component) instead of the photodiode 210. The light sensitive thin film converts photons into electrons. It can be made of nanomaterial such as quantum dots. In an alternative embodiment, the augmented photodetector 200 includes both the photodiode 210 and the light sensitive thin film.

The ADC 220 is coupled to both the photodiode 210 and the memory unit 230. The ADC 220 is an electrical circuit including one or more transistors and comparators. The ADC 220 converts the electrical charge generated by the photodiode 210 into digital signals.

The memory unit 230 stores the digital signals from the ADC 220. The memory unit 230 is a circuit that is used to store binary information. In some embodiments, the memory unit 230 is, e.g., a latch, a DRAM cell, and a digital counter or some other circuit used to store binary information, or some combination thereof. In some embodiments, the memory unit 230 is capable of storing a specific number of bits (e.g., 16 bits or 8 bits). In one embodiment, the memory units 230 of all augmented photodetectors of a tracking sensor have a fixed storage size. In another embodiment, the memory units 230 of some augmented photodetector (e.g., limited augmented photodetectors) of a tracking sensor have a smaller storage size than the other augmented photodetectors of the tracking sensor.

There are several advantages using the augmented photodetector 200. First, the augmented photodetector 200 inherently has high speed. The augmented photodetector 200 includes the ADC 220 that coverts electrical charges into digital signals and the memory unit 230 that stores the digital signals. Thus, the output from the augmented photodetector 200 is in digital format. Compared with analog signals, the readout of digital signals is faster. In one embodiment, the readout speed of a camera including augmented photodetectors 200 is up to hundreds of thousand frames per second.

Second, the augmented photodetector 200 doubles as a frame buffer. An image frame captured by a camera including augmented photodetectors 200 can be temporally stored in the memory units 230 before it is read out. No external memory is required. Third, the ADC 220 individually turns on or off and therefore, saves power. In some embodiments, the ADC 220 requires a constant bias current, which consumes power. A switch transistor can be coupled with the ADC 220. When the ADC 220 is not in use, the switch transistor is open and the constant bias current is not supplied to the ADC 220. Fourth, with stacked sensor technology, there is a clear path to size reduction. The augmented photodetector 200 can have a three-dimension structure, as opposed to traditional two-dimension structures. For example, the photodiode 210 is put on a first layer silicon and the ADC 220 and the memory unit 230 are put on a second layer silicon that is beneath the first layer.

Fifth, the augmented photodetector architecture fits well with various high-dynamic-range imaging schemes. For example, the augmented photodetector 200 can work under a time-to-saturation scheme. The memory unit 230 is used as a counter. The number of clock cycles it takes for the photodiode 210 to reach a certain voltage (saturation level) is recorded as the digitized pixel value. A pixel under strong light has fewer counts before the photodiode 210 reaches saturation, as compared to a pixel under low light. The time-to-saturation scheme ensures that each pixel has a valid digital pixel value at the end of its exposure time and prevents saturation under strong light that causes loss of details. An augmented photodetector may have other advantages and may have other components that are not shown in FIG. 2A.

Figure 2B:
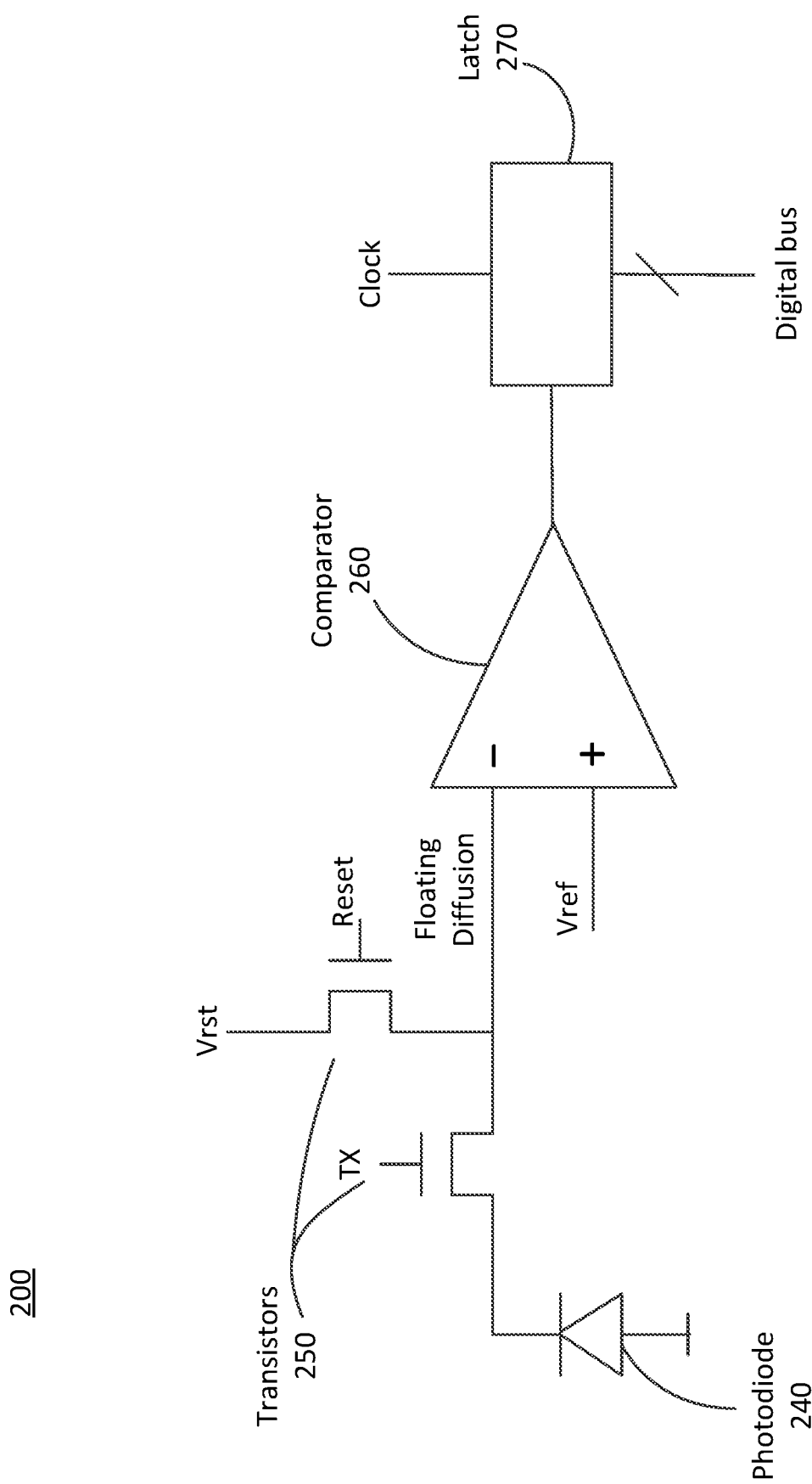
FIG. 2B is a diagram of an example of the augmented photodetector in FIG. 2A.

FIG. 2B is a diagram of an example of the augmented photodetector 200 in FIG. 2A, according to an embodiment. The augmented photodetector 200 comprises a photodiode 240, transistors 250, a comparator 260 and a latch 270. The photodiode 240 has the same functions as the photodiode 210 in FIG. 2A. In one embodiment, the photodiode 240 is a backside illuminated (BSI) photodiode. The transistors 250 and comparator 260 constitutes an ADC 220 as described in conjunction with FIG. 2A. In some embodiments, at the end of the exposure time, the photoelectrons generated by the photodiode 240 are transferred to a floating diffusion (FD) node by pulsing the transistors 250 high for a short period time. The photoelectrons are converted to an analog voltage on the FD node. In some embodiments, the analog voltage may be amplified by an amplifier. The analog voltage is then digitalized by the comparator 260. The comparator 260 compares the analog voltage with a reference voltage Vref and outputs a binary state. For example, the comparator 260 outputs 1 when an analog voltage of a pixel is higher than the reference voltage Vref, and outputs 0 when an analog voltage of a pixel is lower than the reference voltage Vref.

The reference voltage Vref of the comparator 260 may be different for operation in a full frame mode or a tracking mode of the tracking sensor. For example, in the full frame mode, the Vref is set to a low voltage range so that the ADC quantizes all light intensity levels for every photodiode 240 of the tracking sensor 130, whether a photodiode 240 captures structured light reflected from the object or not. For another example, in the tracking mode, the Vref is set to a high voltage range so that the augmented photodetectors capturing structured light reflected from the object and one or more other augmented photodetectors neighboring those augmented photodetectors are quantized while the other augmented photodetectors have zero output. The value of Vref at the tracking mode is at least in part based on wavelength of the structured light, the photodiode 240 and/or the transistors 250.

The latch 270, which is a clocked latch, is an example of the memory unit 220 in FIG. 2A. The latch 270 is controlled by the binary state from the comparator 260. The latch 270 stores the value of digital bus when the comparator 260 outputs change its binary state. In some other embodiments, the pixel level ADC circuit 270 has other types of memory than the latch 270. The augmented photodetector 270 may include a buffer. The buffer stores electrical signals when the augmented photodetectors reads multiple times. The size of the buffer depends at least in part on a reading rate of the augmented photodetectors.

In some embodiments, the augmented photodetector 200 has one layer of silicon. In some other embodiments, the augmented photodetector 200 has more than one layer of silicon. For example, image sensing electronic component, such as a photodiode 240, is on a first layer; a comparator circuit, such as the comparator 260, is on a second layer; and a memory, such as the latch 270, is on a third layer. With multiple layers, the augmented photodetector 200 is more compact and saves space. In embodiments where the augmented photodetector 200 includes a light sensitive thin film instead of the photodiode 240, the light sensitive thin film is on top of a layer of silicon. A comparator circuit and a memory are on the layer of silicon. Accordingly, the augmented photodetector 200 is smaller as the image sensing component is on top, as opposed to side by side, of the layer of silicon.

Turning now to a discussion of modes of operation of a tracking sensor. In FIG. 3A-C, the structured light pattern projected on an object from a structured light emitter is a dot pattern. In some other embodiments, other structured light patterns, such as single line, sinusoid, grid and multi-tone pattern, may be used and identified. Dots reflected from the object are captured by an augmented camera that includes a tracking sensor comprising a plurality of augmented photodetectors and/or limited augmented photodetectors. In FIG. 3A-C, the number of augmented photodetectors and dots are reduced for simplicity. Each of the tracking sensors comprises 64 augmented photodetectors and/or limited augmented photodetectors. Four dots are emitted from the structured light emitter and projected on the object. In some other embodiments, there are a different number of dots projected to the object and captured by the augmented camera, or a different number of augmented photodetectors and/or limited augmented photodetectors in the tracking sensor.

FIG. 3A is a diagram of a tracking sensor 310 that includes augmented photodetectors, the tracking sensor 310 configured to operate in a full frame mode, in accordance with an embodiment. In this example, the tracking sensor 310 is detecting reflected and/or scattered structured light. The detected structured light is illustrated as dots 314. In the full frame mode, all the 64 augmented photodetectors 312 convert photons to digital signals and store the digital signals in their memory units. The memory units of the 64 augmented photodetectors 312 have the same storage size (e.g., 16 bit). The augmented camera generates a full-frame image based on the 64 augmented photodetectors 312, which associates a normal pixel to each augmented photodetector 312. The locations of the dots are determined from the full-frame image. The depth information of the object can be generated by using a known structure of the dot pattern, to determine distortions in the image caused by distances between the object and the augmented camera.

FIG. 3B is a diagram of a tracking sensor 320 that includes both augmented photodetectors 322 and limited augmented photodetectors 324, the tracking sensor 320 configured to operate in a full frame mode, in accordance with an embodiment. As noted above with regard to FIGS. 1 and 2A, the memory units of the limited augmented photodetectors 322 have a smaller storage size than those of the augmented photodetectors 324. Accordingly, the digital signals from the limited augmented photodetectors 322 have less bits than the digital signal from the augmented photodetectors 324. For example, each of the digital signals of the four augmented photodetectors 324 have 16 bit; while each of the digital signals of the limited augmented photodetectors 322 have 8 bit. In the embodiment of FIG. 3B, the tracking sensor 320 has four augmented photodetectors 324. Thus, the dots 326 are not necessarily located on the augmented photodetectors 324. In some embodiments, locations of the augmented photodetectors 332 on the tracking sensor 320 are determined based on expected locations of the dots 326. The expected locations of the dots 326 can be determined by using a known structured light pattern projected by the structured light emitter and/or previous depth information of the object.

An augmented camera (e.g., the augmented camera 120) reads out the digital signals from the memory units of the limited augmented photodetectors 322 and augmented photodetectors 324 and generates a truncated image. The truncated image comprises truncated pixels corresponding to the limited augmented photodetectors 322 and normal pixels corresponding to the augmented photodetectors 324. One advantage of the tracking sensor 320 is that the truncated pixels take up less space than normal pixels. Thus, compared with the tracking sensor 310, less memory and power is consumed.

FIG. 3C is a diagram of a tracking sensor 330 configured to operate in a tracking mode, in accordance with an embodiment. The tracking sensor 330 can be either the tracking sensor 310 or the tracking sensor 320. But the augmented camera does not read out digital signals from all the augmented photodetectors and/or limited augmented photodetectors of the tracking sensor 330. In the embodiment of FIG. 3C, a group of augmented photodetectors 332 are selected, from which the augmented camera reads out digital signals. In alternative embodiments, one or more augmented photodetectors and/or one or more limited augmented photodetectors may be selected.

Selecting the selected augmented photodetectors 332 is based on identification of expected locations of the dots 334. An n×n array of augmented photodetectors on or neighboring the expected location of each dot generates digital signals. In the embodiment where the tracking sensor includes 64 augmented photodetectors, n can be any whole number less than 8. In the embodiment of FIG. 3C, a 2×2 array of augmented photodetectors for each dot 334 is selected. An augmented camera reads out the digital signals from the selected augmented photodetectors 332 and assigns a black value (i.e., zero) to some or all of the other augmented photodetectors and/or limited augmented photodetectors to generate an image frame. Alternatively, the augmented camera outputs the digital signals as image data; and a controller receiving image data assigns a black value to each of the other augmented photodetectors and/or limited augmented photodetectors to generate an image frame. The image comprises less pixels compared with the image in FIG. 3A or FIG. 3B. In some embodiments, the operating mode of the tracking sensor 330 alternates between the tracking mode and the full frame mode discussed in conjunction with FIG. 3A or FIG. 3B.

Figure 4:
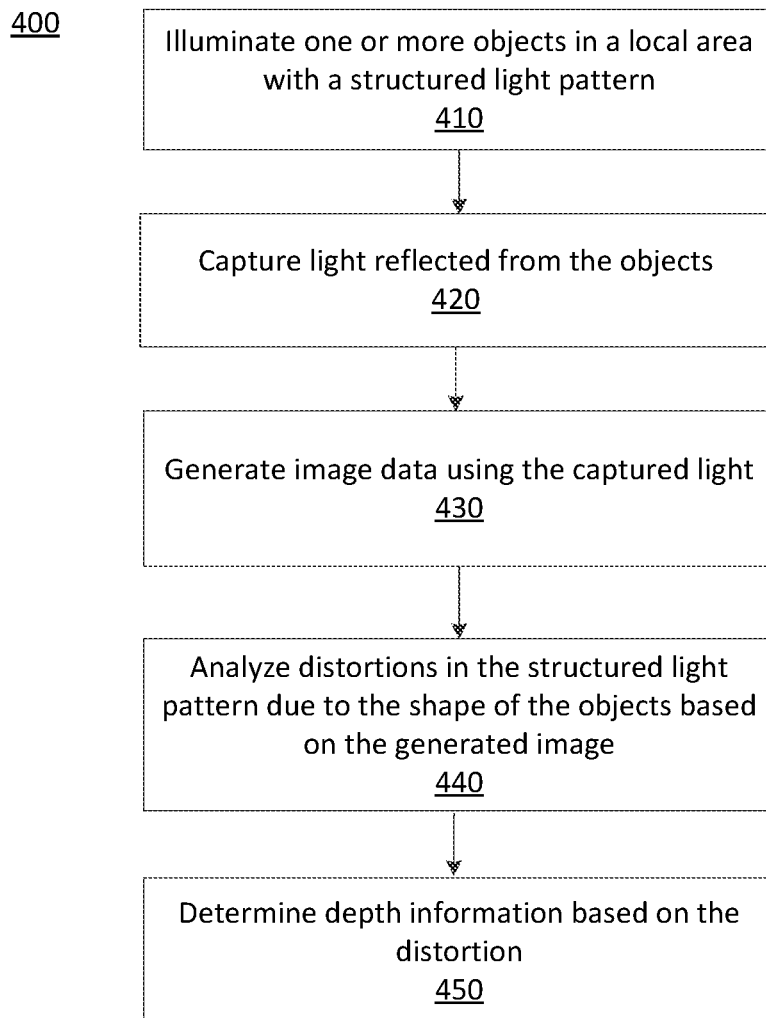
FIG. 4 is a flow chart of a process for depth measurement, in accordance with an embodiment.

FIG. 4 is a flowchart of one embodiment of a process 400 for depth measurement, in accordance with an embodiment. The process 400 is performed by a depth measurement unit 100 described in conjunction with FIG. 1. Alternatively, other components may perform some or all of the steps of the process 400. For example, in some embodiments, a HMD and/or a console may perform some of the steps of the process 400. Additionally, the process 400 may include different or additional steps than those described in conjunction with FIG. 4 in some embodiments or perform steps in different orders than the order described in conjunction with FIG. 4.

The depth measurement unit 100 illuminates 410 one or more objects in a local area with a structured light pattern. For example, a structured light emitter of the depth measurement unit 100 projects dots on an object in a local area. For another example, a structured light emitter of the depth measurement unit 100 projects dots on an eye of a user. The depth measurement unit 100 may use more than structured light emitter to illuminate more than one object.

The depth measurement unit 100 captures 420 light reflected from the objects. Capture of the reflected light can be done by a tracking sensor (e.g., the tracking sensor 130) included in an augmented camera (e.g., the augmented camera 120). The tracking sensor converts the captured light to digital signals for generating images. The tracking sensor can capture all or portions of the reflected light, depending on the modes of operation of the tracking sensor. In one embodiment, the tracking sensor includes a plurality of augmented photodetectors. In another embodiment, the tracking sensor includes a plurality of limited augmented photodetectors and a plurality of augmented photodetectors. The limited augmented photodetectors have memory units with smaller storage size, compared with the augmented photodetectors.

The depth measurement unit 100 generates 430 image data using the captured light. For example, the augmented camera reads out digital signals from the augmented photodetectors and/or limited augmented photodetectors of the tracking sensor operating in a full frame mode and outputs the digital signals as image data. The digital signals from the limited augmented photodetectors have less bits than those from the augmented photodetectors. Alternatively, the tracking sensor may operate in a tracking mode, where the augmented camera reads out digital signals from only selected augmented photodetectors and/or limited augmented photodetectors based on a camera instruction. In one embodiment, the augmented camera reads out digital signals from the selected augmented photodetectors and/or limited augmented photodetectors and outputs the digital signals as image data. A controller (e.g., the controller 140), included in or otherwise associated with the depth measurement unit 100, receives the image data and assigns a value (e.g., zero) to each of the non-readout augmented photodetectors and/or limited augmented photodetectors to generate an image frame. In another embodiment, the augmented camera assigns a value to each of the non-readout augmented photodetectors and/or limited augmented photodetectors and outputs the values and the digital signals as image data. The controller generates an image frame based on the image data.

In embodiments where the tracking sensor includes the filter discussed above, the augmented camera reads out digital signals that exceed a threshold value. The augmented camera may assign a value (e.g., zero) to each non-readout augmented photodetector or limited augmented photodetector. Image date output from the augmented camera includes the digital signals exceeding the threshold value and the assigned values. Alternatively, the controller may assign a value to each non-readout augmented photodetector or limited augmented photodetector.

The depth measurement unit 100 analyzes 440 distortions in the structured light pattern due to the shape of the objects based on the generated image. A model of each object stored in a database associated with the depth measurement unit 100 may be used for the analysis. The depth measurement unit 100 further determines 450 depth information of the objects based on the distortions. Analyzing the distortions and determining depth information can be done by the controller.

In addition to the depth measurement unit 100, other components may perform some or all of the steps of the process 400. Also, the process 400 may include different or additional steps than those described in conjunction with FIG. 4 in some embodiments or perform steps in different orders than the order described in conjunction with FIG. 4.

Figure 5:
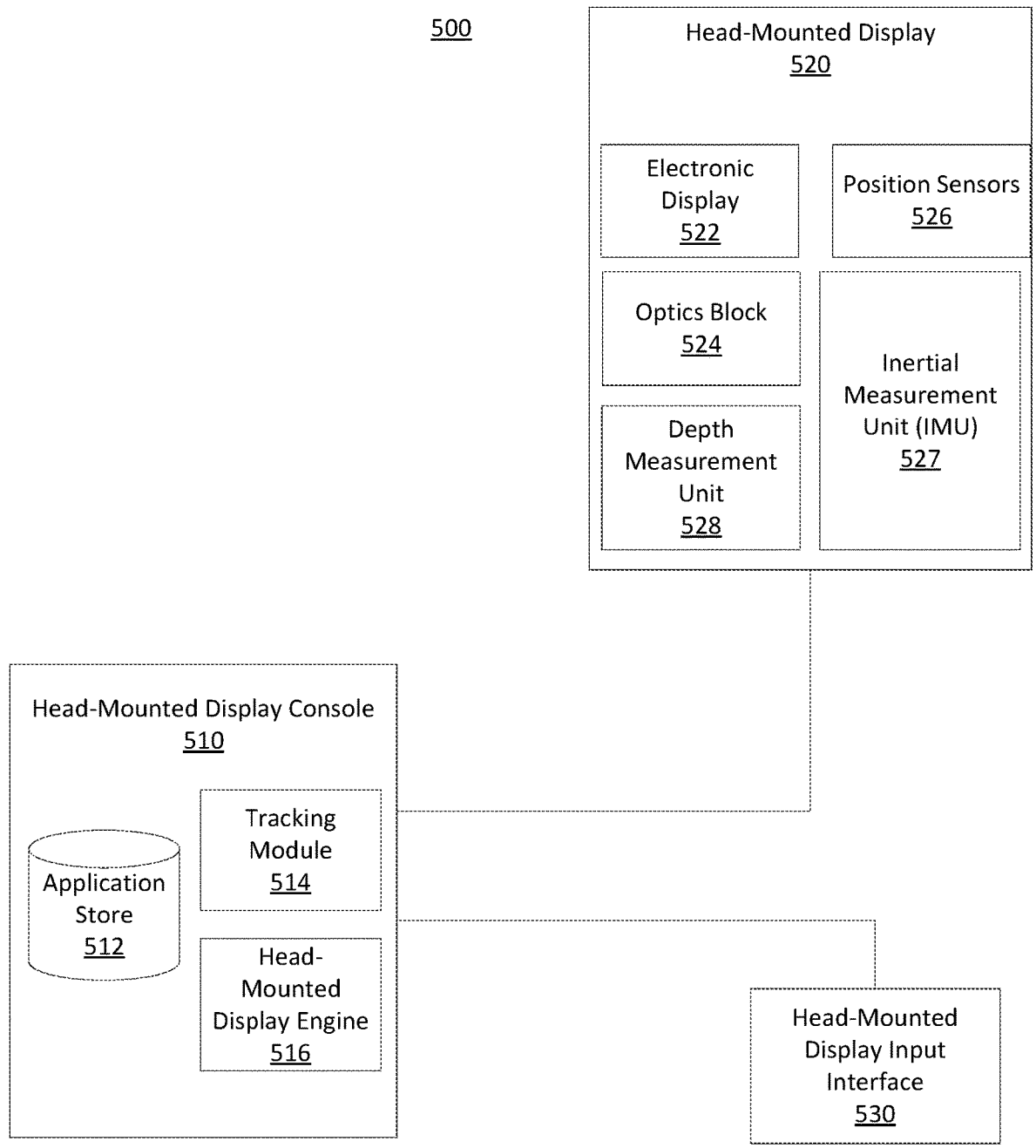
FIG. 5 is a block diagram of a HMD system environment, in accordance with an embodiment.

FIG. 5 is a block diagram of a HMD system 500 in which a HMD console 510 operates. The HMD system 500 may operate in a VR system environment, an AR system environment, a mixed reality (MR) system environment, or some combination thereof. The HMD system 500 shown by FIG. 5 comprises a HMD 520, and a HMD input interface 530 that are each coupled to the HMD console 510. While FIG. 5 shows an example system 500 including one HMD 520 and one HMD input interface 530, in other embodiments any number of these components may be included in the system 500. For example, there may be multiple HMDs 520, each having an associated HMD input interface 530 and communicating with the HMD console 510. In alternative configurations, different and/or additional components may be included in the system environment 500. Similarly, functionality of one or more of the components can be distributed among the components in a different manner than is described here. For example, some or all of the functionality of the HMD console 510 may be contained within the HMD 520.

The HMD 520 is a head-mounted display that presents content to a user comprising virtual and/or augmented views of a physical, real-world environment with computer-generated elements (e.g., 2D or 3D images, 2D or 3D video, sound, etc.). Examples of media presented by the HMD 520 include one or more images, video, audio, or some combination thereof. In some embodiments, audio is presented via an external device (e.g., speakers and/or headphones) that receives audio information from the HMD 520, the console 510, or both, and presents audio data based on the audio information. Some embodiments of the HMD 520 are further described below in conjunction with FIG. 6 and FIG. 7.

The HMD 520 includes an electronic display 522, an optics block 524, one or more position sensors 526, an inertial measurement unit (IMU) 527, and a depth measurement unit 528. Some embodiments of the HMD 520 have different components than those described here. Similarly, the functions can be distributed among other components in the HMD system 500 in a different manner than is described here. For example, some of the functions of the depth measurement unit 528 may be performed by the HMD console 510.

The electronic display 522 displays images to the user in accordance with data received from the HMD console 510. The electronic display 522 displays 2D or 3D images to the user in accordance with data received from the console 640. In various embodiments, the electronic display 522 comprises a single electronic display panel or multiple electronic display panels (e.g., a display for each eye of a user). Examples of an electronic display panel include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, or some combination thereof.

The optics block 524 magnifies received light from the electronic display 522, corrects optical errors associated with the image light, and the corrected image light is presented to a user of the HMD 520. The optics block 524 is an optical element, such as an aperture, a Fresnel lens, a convex lens, a concave lens, a filter, or any other suitable optical element that affects the image light emitted from the electronic display 522. Moreover, the optics block 524 may include combinations of different optical elements. In some embodiments, one or more of the optical elements in the optics block 524 may have one or more coatings, such as partial reflectors or anti-reflective coatings.

Magnification of the image light by the optics block 524 allows the electronic display 522 to be physically smaller, weigh less, and consume less power than larger displays. Additionally, magnification may increase a field of view of the displayed media. For example, the field of view of the displayed media is such that the displayed media is presented using almost all (e.g., 110° diagonal), and in some cases all, of the user's instantaneous field of view. In some embodiments, the effective focal length the optics block 524 is larger than the spacing to the electronic display 522. Consequently, the optics block 524 magnifies the image light projected by the electronic display 522. Additionally, in some embodiments, the amount of magnification may be adjusted by adding or removing optical elements.

The optics block 524 may be designed to correct one or more types of optical error. Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, chromatic aberration, field curvature, astigmatism, or any other type of three-dimensional optical error. In some embodiments, content provided to the electronic display 522 for display is pre-distorted, and the optics block 524 corrects the distortion when it receives image light from the electronic display 522 generated based on the content.

The IMU 527 is an electronic device that generates fast calibration data based on measurement signals received from one or more of the position sensors 526. A position sensor 526 generates one or more measurement signals in response to motion of the HMD 520. Examples of position sensors 526 include: one or more accelerometers, one or more gyroscopes, one or more magnetometers, another suitable type of sensor that detects motion, a type of sensor used for error correction of the IMU 527, or some combination thereof. The position sensors 526 may be located external to the IMU 527, internal to the IMU 527, or some combination thereof.

Based on the one or more measurement signals from one or more position sensors 526, the IMU 527 generates fast calibration data indicating an estimated position of the HMD 520 relative to an initial position of the HMD 520. For example, the position sensors 526 include multiple accelerometers to measure translational motion (forward/back, up/down, left/right) and multiple gyroscopes to measure rotational motion (e.g., pitch, yaw, or roll). In some embodiments, the IMU 527 rapidly samples the measurement signals and calculates the estimated position of the HMD 520 from the sampled data. For example, the IMU 527 integrates the measurement signals received from the accelerometers over time to estimate a velocity vector and integrates the velocity vector over time to determine an estimated position of a reference point on the HMD 520. Alternatively, the IMU 527 provides the sampled measurement signals to the HMD console 510, which determines the fast calibration data. The reference point is a point that may be used to describe the position of the HMD 520. While the reference point may generally be defined as a point in space; however, in practice the reference point is defined as a point within the HMD 520 (e.g., a center of the IMU 527).

The IMU 527 receives one or more calibration parameters from the HMD console 510. As further discussed below, the one or more calibration parameters are used to maintain tracking of the HMD 520. Based on a received calibration parameter, the IMU 527 may adjust one or more IMU parameters (e.g., sample rate). In some embodiments, certain calibration parameters cause the IMU 527 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The depth measurement unit 528 determines depth information of objects, e.g., one or both eyes of a user of the HMD 520 or one or more objects in a local area surrounding the HMD 520. In some embodiments, the depth measurement unit 528 is the depth measurement unit 100 described in FIG. 1. The depth measurement unit 528 includes a structured light emitter, an augmented camera, and a controller. The structured light emitter emits a structured light pattern. The augmented camera generates images by capturing the structured light reflected from the objects in a field of view of the augmented camera. The controller controls the structured light emitter and the augmented camera and receives images of the objects generated by the augmented camera. Based on the images of an object from the augmented camera and a known structured of the project, the controller analyzes the distortion of the light caused by the shape of the object's surface and geometry, generates depth information of the object, and outputs depth information of the object. In some other embodiments, the functions of the depth measurement unit 100 described FIG. 1 may be distributed among other components in the HMD system environment 500 in different manners in other embodiments. For example, some or all of the functionality provided by the controller 140 may be performed by the HMD console 510. Alternatively, some of the control and processing modules of the depth measurement unit 100 are part of the HMD 520, and others are part of the HMD console 510.

The HMD input interface 530 is a device that allows a user to send action requests to the HMD console 510. An action request is a request to perform a particular action. For example, an action request may be to start or end an application or to perform a particular action within the application. The HMD input interface 530 may include one or more input devices. Example input devices include: a keyboard, a mouse, a game controller, or any other suitable device for receiving action requests and communicating the received action requests to the HMD console 510. An action request received by the HMD input interface 530 is communicated to the HMD console 510, which performs an action corresponding to the action request. In some embodiments, the HMD input interface 530 may provide haptic feedback to the user in accordance with instructions received from the HMD console 510. For example, haptic feedback is provided when an action request is received, or the HMD console 510 communicates instructions to the HMD input interface 530 causing the HMD input interface 530 to generate haptic feedback when the HMD console 510 performs an action.

The HMD console 510 provides media to the HMD 520 for presentation to the user in accordance with information received from the HMD 520 and/or the HMD input interface 530. In the example shown in FIG. 5, the HMD console 510 includes an application store 512, a tracking module 514, and a HMD engine 516. Some embodiments of the HMD console 510 have different modules than those described in conjunction with FIG. 5. Similarly, the functions further described below may be distributed among components of the HMD console 510 in a different manner than is described here.

The application store 512 stores one or more applications for execution by the HMD console 510. An application is a group of instructions, that when executed by a processor, generates content for presentation to the user. Content generated by an application may be in response to inputs received from the user via movement of the HMD 520 or the HMD input interface 530. Examples of applications include: gaming applications, conferencing applications, video playback application, or other suitable applications.

The tracking module 514 calibrates the HMD system 500 using one or more calibration parameters and may adjust one or more calibration parameters to reduce error in determination of the position of the HMD 520. Moreover, calibration performed by the tracking module 514 also accounts for information received from the IMU 527. Additionally, if tracking of the HMD 520 is lost, the tracking module 514 re-calibrates some or all of the HMD system 500.

The tracking module 514 tracks movements of the HMD 520. The tracking module 514 determines positions of a reference point of the HMD 520 using position information from fast calibration information. Additionally, in some embodiments, the tracking module 514 may use portions of the fast calibration information to predict a future location of the HMD 520. Alternatively, the tracking module 514 may use depth information generated by the depth measurement unit 528 to track movements of the HMD 520. For example, the depth measurement unit 528 generates depth information of an object that is still as to the local area surrounding the HMD 520. Using the depth information, the tracing module 514 can determine movements of the object relative to the HMD 520, which is opposite to movements of the HMD 520 in the local area. The tracking module 514 provides the estimated or predicted future position of the HMD 520 to the HMD engine 516.

The HMD engine 516 executes applications within the system environment 100 and receives depth information, position information, acceleration information, velocity information, predicted future positions, or some combination thereof of the HMD 520 from the tracking module 514. Based on the received information, the HMD engine 516 determines content to provide to the HMD 520 for presentation to the user. For example, if the received depth information indicates that an object has moved further from the HMD 520, the HMD engine 516 generates content for the HMD 520 that mirrors the object's movement in an augmented reality environment. Additionally, the HMD engine 516 performs an action within an application executing on the HMD console 510 in response to an action request received from the HMD input interface 530 and provides feedback to the user that the action was performed. The provided feedback may be visual or audible feedback via the HMD 520 or haptic feedback via the HMD input interface 530.

Figure 6:
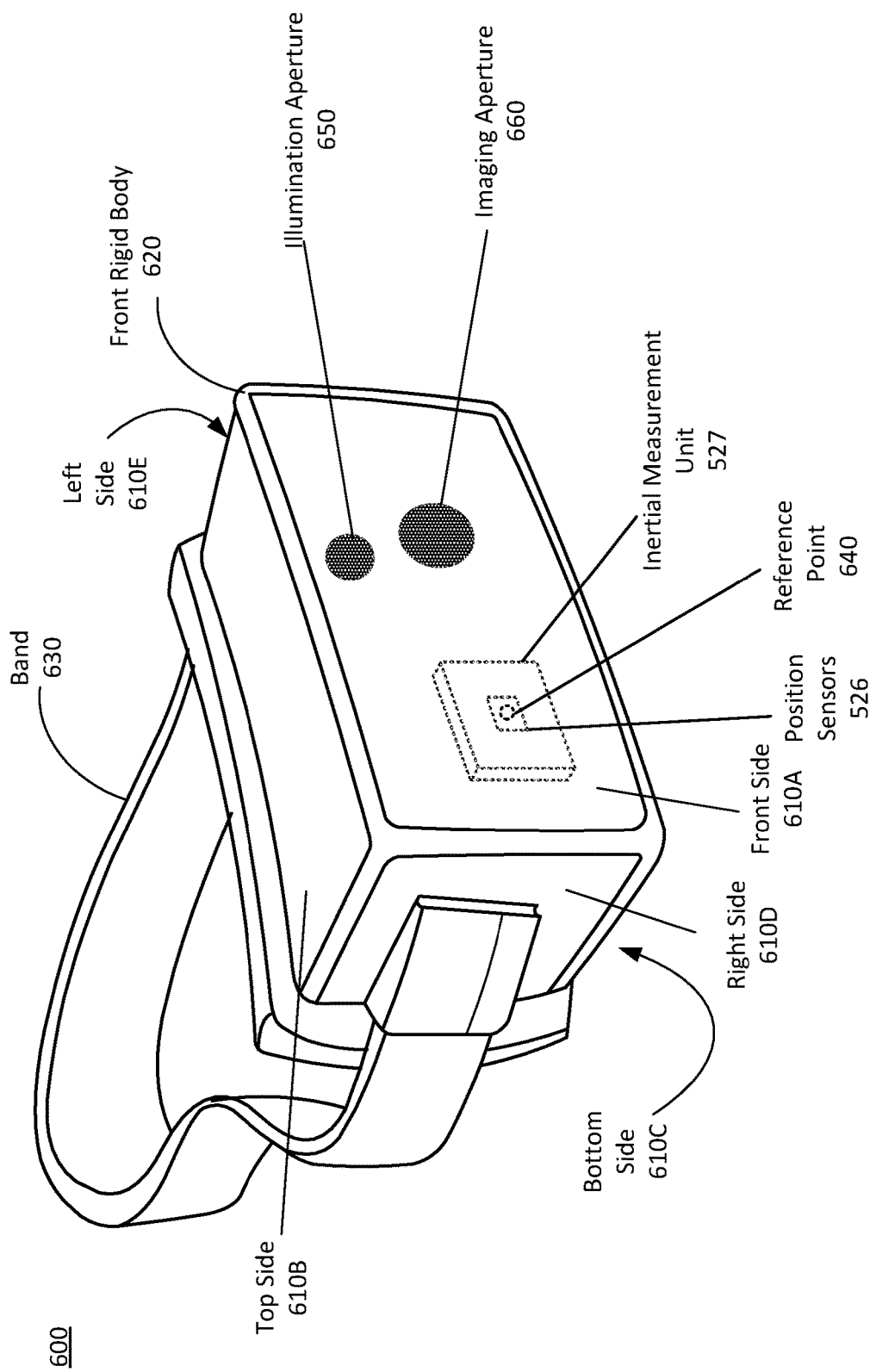
FIG. 6 is a wire diagram of a HMD, in accordance with an embodiment.

FIG. 6 is a wire diagram of a HMD 600, in accordance with an embodiment. The HMD 600 is an embodiment of the HMD 520. The HMD 600 may be part of, e.g., a VR system, an AR system, a MR system, or some combination thereof. In embodiments that describe AR system and/or a MR system, portions of the HMD 600 that are between a front side 610A of the HMD 600 and an eye of the user are at least partially transparent (e.g., a partially transparent electronic display). The HMD 600 includes a front side 610A, a top side 610B, a bottom side 610C, a right side 610D, a left side 610E, a front rigid body 620, and a band 630. The front rigid body 620 also includes an IMU 527, the one or more position sensors 526, and a reference point 640. In the embodiment shown by FIG. 6, the position sensors 526 are located within the IMU 527, and neither the IMU 527 nor the position sensors 526 are visible to the user.

The HMD 600 also includes a depth measurement unit (e.g., the depth measurement unit 100). Some embodiments of the depth measurement unit include a structured light emitter and an augmented camera. The structured light emitter emits structured light towards an object, e.g., a local area or an eye of a user. The augmented camera captures structured light reflected from the object and may also capture ambient light. The HMD 600 shown in FIG. 6 depicts an illumination aperture 650 and an imaging aperture 660. The structured emitter emits structured light through the illumination aperture 650. And the augmented camera captures structured light reflected from the object through the image aperture 660.

Figure 7:
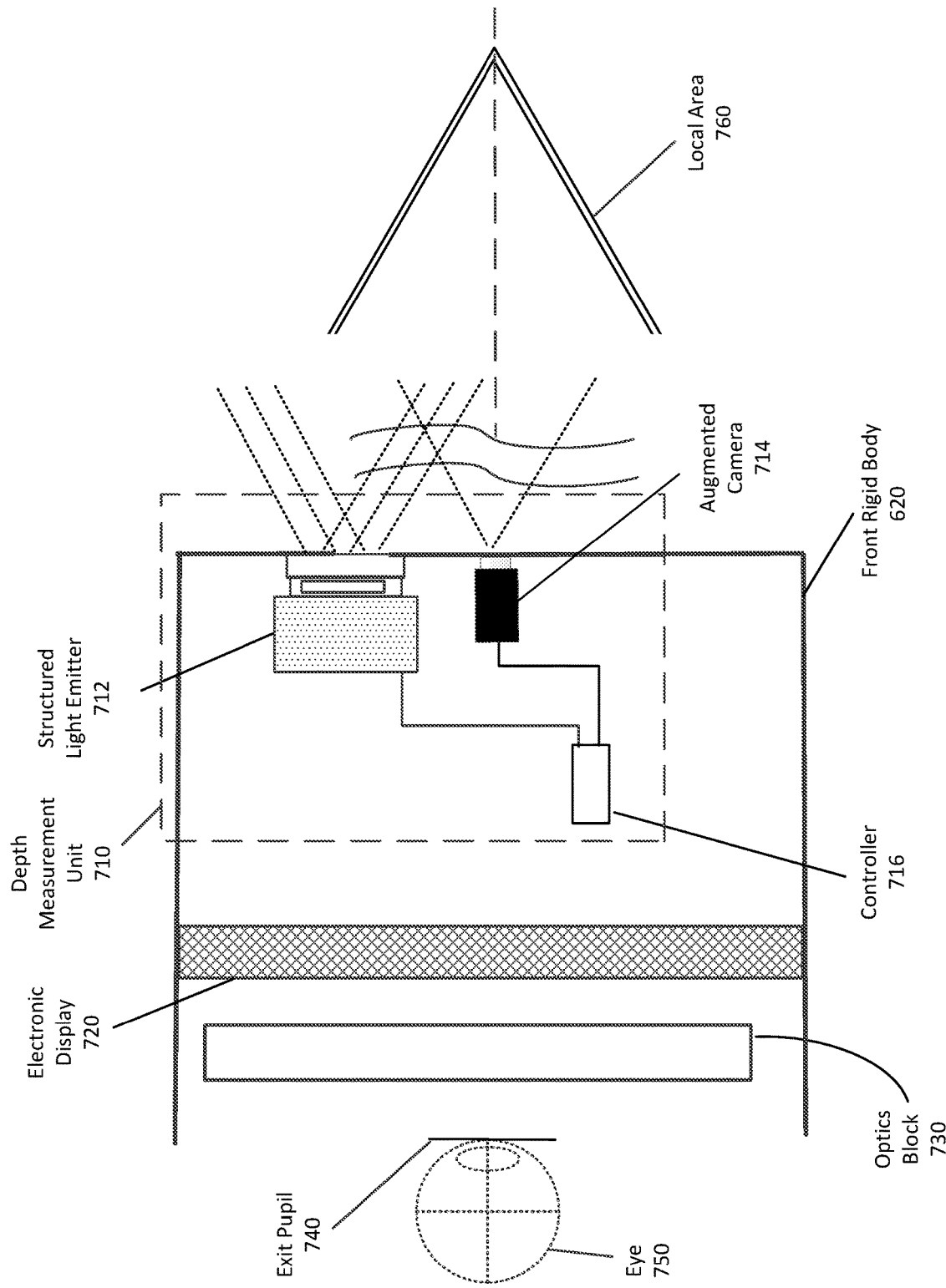
FIG. 7 is a cross section of a front rigid body of the HMD in FIG. 6, in accordance with an embodiment.

FIG. 7 is a cross section 700 of the front rigid body 620 of the embodiment of the HMD 600 shown in FIG. 6. The front rigid body 620 includes a depth measurement unit 710, an electronic display 720, and an optics block 730. Some embodiments of the front rigid body 620 have different components than those described here. Similarly, in some cases, functions can be distributed among the components in a different manner than is described here. The front rigid body 620 also includes an exit pupil 740 where an eye 750 of a user would be located. For purposes of illustration, FIG. 7 shows a cross section of the front rigid body 620 in accordance with a single eye 750. Although FIG. 7 depicts a center cross-section of the eye 750 as being in the same plane as the depth measurement unit 710, the center cross-section of the eye 750 and the depth measurement unit 710 do not have to be in the same plane. Additionally, another electronic display 125 and optics block 130, separate from those shown in FIG. 3, may be included in the front rigid body 620 to present content, such as an augmented representation of a local area 760 or virtual content, to another eye of the user.

The depth measurement unit 710 includes a structured light emitter 712, an augmented camera 714, and a controller 770. The depth measurement unit 710 is an embodiment of the depth measurement unit 100, the structured light emitter 712 is an embodiment of the structure light emitter 110, the augmented camera 713 is an embodiment of the augmented camera 120, and the controller 716 is an embodiment of the controller 140. The structured light emitter 712 illuminates the local area 760 with structured light. The augmented camera 714 captures images of the local area 760 and outputs image data to the controller 716.

In some embodiments, the controller 716 is configured to determine depth information for objects in the local area 760 using image data from the augmented camera 714. The controller 716 controls how light is emitted from the structured light emitter 712 and how the augmented camera 714 captures light. For example, the controller 716 controls properties such as timing, intensity, wavelength range, polarization, field of view limits, and density (in the case of SL) of the structured light emitter 712. The controller 716 can also control the timing of when data is collected from the augmented camera 714. Thus, the controller 716 can coordinate the capturing of data by the augmented camera 714 with light emission by the structured light emitter 712. In alternate embodiments, some other device (e.g., the HMD console 510) determines depth information for the local area 760.

As shown in FIG. 7, the depth measurement unit 710 is on a different side of the optical block 730 and the electronic display 720 from the eye 750. However, in some embodiments a depth measurement unit 710 may be used to track the eye 750. To track the eye 750, the depth measurement unit 710 is positioned in a way that light emitted from the structured light emitter 712 reaches the eye 750 and the augmented camera 714 can capture light reflected from the eye 750 to generate images of the eye 750 (and specifically cornea of the eye 750). The depth measurement unit 710 may be positioned either on-axis along the user's vision or can be placed off-axis from the user's vision. Based on the images of the eye 750, the controller 716 generates depth information of the eye 750 and tracks orientations of the eye 750.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A depth measurement unit (DMU) comprising:
a structured light emitter configured to project a structured light pattern into a local area;
an augmented camera comprising a tracking sensor that includes a plurality of augmented photodetectors, each augmented photodetector includes an analog-to-digital converter and a corresponding memory unit, each augmented photodetector configured to convert some of the structured light pattern reflected from an object in the local area to data and store the data in its corresponding memory unit, the tracking sensor configured to operate in a tracking mode, and the augmented camera in the tracking mode configured to:
capture some of the structured light pattern reflected from an object in the local area,
read out data stored in the memory units of a subset of the plurality of augmented photodetectors in accordance with camera instructions, and
generate image data using the data read out from the subset of the plurality of augmented photodetectors; and
a controller configured to:
generate the camera instructions by predicting locations of the structured light pattern in the plurality of augmented photodetectors and selecting the subset of the plurality of augmented photodetectors from the plurality of augmented photodetectors based on the predicted locations, and
determine depth information of the object in the local area based in part on the image data generated using the data read out from the subset of the plurality of augmented photodetectors.

2. The DMU of claim 1, wherein the memory unit of each augmented photodetector has a same storage size.

3. The DMU of claim 1, wherein the plurality of augmented photodetectors include at least a first group of augmented photodetectors and a second group of augmented photodetectors, and the memory units of the first group of augmented photodetectors have a smaller storage size than the memory units of the second group of augmented photodetectors.

4. The DMU of claim 3, wherein the tracking sensor is configured to operate in a full frame mode, and the augmented camera is configured to generate the image data using data read out from all the augmented photodetectors in the first group and all the augmented photodetectors in the second group.

5. The DMU of claim 1, wherein the tracking sensor is also configured to operate in a full frame mode, and the augmented camera is configured to generate the image data using data read out all of the plurality of augmented photodetectors in the full frame mode.

6. The DMU of claim 5, wherein the image data from the full frame mode and the tracking mode are interleaved.

7. The DMU of claim 5, wherein the tracking sensor is configured to operate in the full frame mode periodically.

8. A head-mounted display (HMD) comprising:
a depth measurement unit comprising:
a structured light emitter configured to project a structured light pattern into a local area,
an augmented camera that includes a tracking sensor comprising a plurality of augmented photodetectors, each augmented photodetector includes an analog-to-digital converter and a corresponding memory unit, each augmented photodetector configured to convert some of the structured light pattern reflected from an object in the local area to data and store the data in its corresponding memory unit, the tracking sensor configured to operate in a tracking mode, and the augmented camera in the tracking mode configured to:
capture some of the structured light pattern reflected from an object in the local area,
read out data stored in the memory units of a subset of the plurality of augmented photodetectors in accordance with camera instructions, and
generate image data using the data read out from the subset of the plurality of augmented photodetectors; and
a controller configured to:
generate the camera instructions by predicting locations of the structured light pattern in the plurality of augmented photodetectors and selecting the subset of the plurality of augmented photodetectors from the plurality of augmented photodetectors based on the predicted locations, and
determine depth information of the object in the local area based in part on the image data generated using the data read out from the subset of the plurality of augmented photodetectors;
an electronic display configured to display a virtual object based in part on the depth information; and
an optics block configured to direct light from the electronic display element to an exit pupil of the HMD.

9. The HMD of claim 8, wherein the memory unit of each augmented photodetector has a same storage size.

10. The HMD of claim 8, wherein the plurality of augmented photodetectors include at least a first group of augmented photodetectors and a second group of augmented photodetectors, and the memory units of the first group of augmented photodetectors have a smaller storage size than the memory units of the second group of augmented photodetectors.

11. The HMD of claim 8, wherein the tracking sensor is also configured to operate in a full frame mode, and the augmented camera is configured to generate the image data using data read out from all of the plurality of augmented photodetectors in the full frame mode.

12. An augmented camera comprising:
a tracking sensor comprising a plurality of augmented photodetectors, each augmented photodetector includes an analog-to-digital converter (ADC) and a corresponding memory unit, each augmented photodetector configured to convert light to data and store the data in its corresponding memory unit, and the tracking sensor configured to operate in a tracking mode;
the augmented camera in the tracking mode configured to:
capture light reflected from an object in the local area, read out data stored in the memory units of a subset of the plurality of augmented photodetectors in accordance with camera instructions, the camera instructions generated by predicting locations of a structured light pattern in the plurality of augmented photodetectors and selecting the subset of the plurality of augmented photodetectors from the plurality of augmented photodetectors based on the predicted locations, and generate image data using the data read out from the subset of the plurality of augmented photodetectors.

13. The augmented camera of claim 12, wherein the memory unit of each augmented photodetector has a same storage size.

14. The augmented camera of claim 12, wherein the plurality of augmented photodetectors include at least a first group of augmented photodetectors and a second group of augmented photodetectors, and the memory units of the first group of augmented photodetectors have a smaller storage size than the memory units of the second group of augmented photodetectors.

15. The augmented camera of claim 12, wherein the tracking sensor is also configured to operate in a full frame mode, and the augmented camera is configured to generate the image data using data read out from all of the plurality of augmented photodetectors in the full frame mode.

16. The augmented camera of claim 15, wherein the image data from the full frame mode and the tracking mode are interleaved.

17. The augmented camera of claim 12, wherein an augmented photodetector is configured to operate under a time-to-saturation scheme and the memory unit of the augmented photodetector is configured to operate as a counter.

18. The augmented camera of claim 12, wherein each augmented photodetector further includes a corresponding photodiode, the photodiode of an augmented photodetector is on a first layer silicon and the ADC and the memory unit of the augmented photodetector is on a second layer silicon.

19. The augmented camera of claim 12, wherein each augmented photodetector further includes a light sensitive component configured to convert photons to electrons, the component selected from a group consisting of a thin film and a photodiode.

* * * * *